March 2, 1971     G. R. BOWER     3,566,523

COMBINATION PHOTOGRAPHIC IMAGE CONTAINER AND VIEWER

Filed July 29, 1968     2 Sheets-Sheet 1

GEORGE R. BOWER
INVENTOR.

BY *J. Herman Childress*
*Robert W. Hampton*
ATTORNEYS

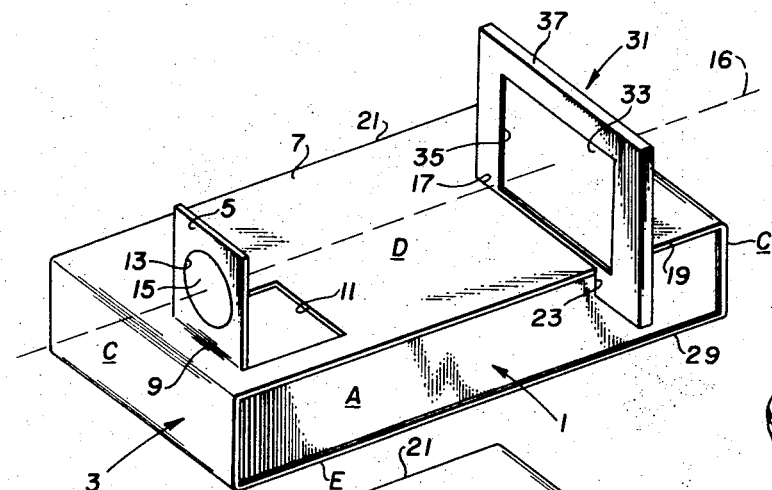
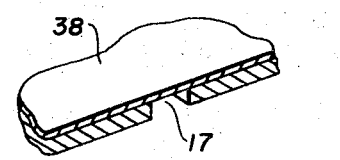
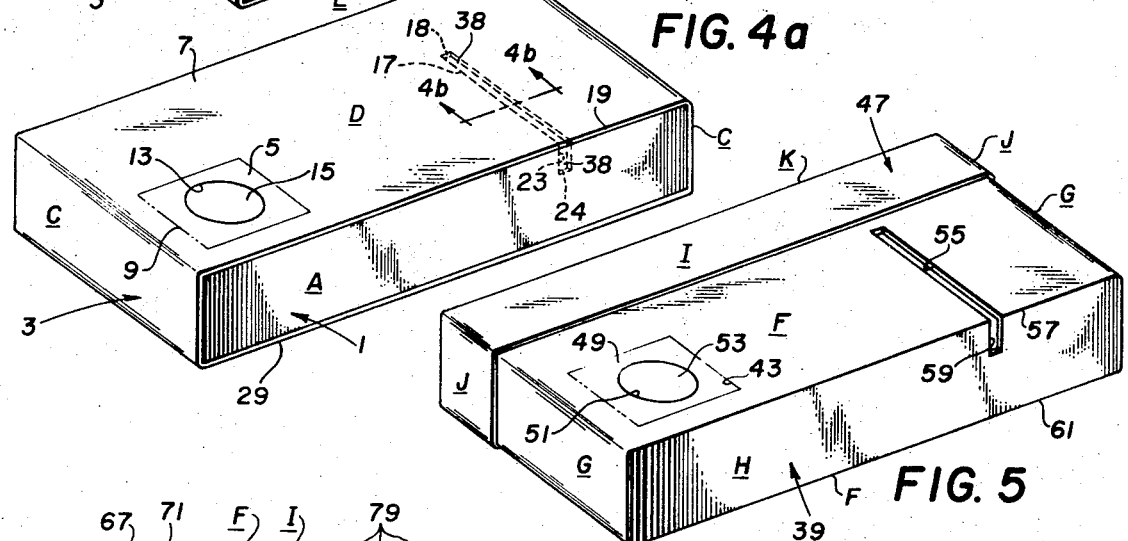
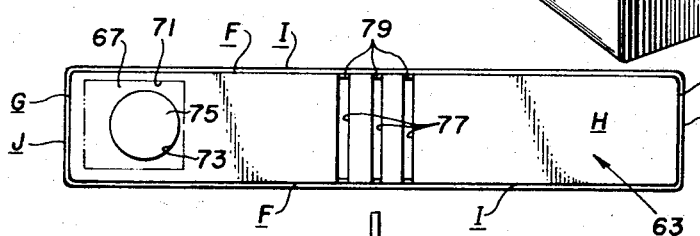
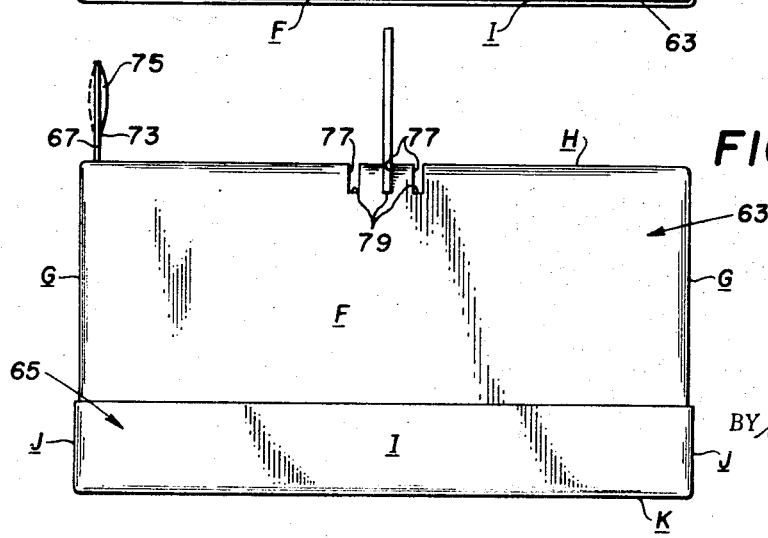

United States Patent Office 3,566,523
Patented Mar. 2, 1971

3,566,523
**COMBINATION PHOTOGRAPHIC IMAGE
CONTAINER AND VIEWER**
George R. Bower, Holley, N.Y., assignor to Eastman
Kodak Company, Rochester, N.Y.
Filed July 29, 1968, Ser. No. 748,439
Int. Cl. G09f 11/30
U.S. Cl. 40—63                                    5 Claims

ABSTRACT OF THE DISCLOSURE

A mailing and storage container for use by film processors for delivering photographic images to customers has a lens and a slot which adapt the container for use as a viewer of the images. A photographic image is supported in the slot and then viewed through the lens.

BACKGROUND OF THE INVENTION

Field of the Invention

This invention relates to a mailing and storage container for photographic records (e.g., transparencies and other photographic images) and which can also serve as a viewer for the records using available light.

Description of the prior art

Transparency container and viewer combinations are known in the art. U.S. Pat. 2,882,628 discloses a container with a cover permanently hinged thereto, which serves as a photographic transparency viewer. Available light is directed from a reflective surface to a light diffusing screen disposed in the container, thereby to illuminate a transparency, while the cover serves to elevate the container to a particular inclination. U.S. Pat. 3,061,961 discloses a device having a container and a removable top with a lens disposed therein. When using this device, a photographic transparency is completely inserted within the container, the top is attached to the container, and the transparency is viewed through the lens utilizing light transmitted through the walls of the container. U.S. Pat. 3,349,509 discloses a container for storing photographic transparencies and a container top with a lens disposed therein for viewing the transparencies. The lens is located in one wall of the top and the transparency is supported in the oposite wall thereof. British Pat. 11,139 discloses a container-viewer combination for observing pictures or the like. The container is formed of cardboard and has a lens disposed in an opening of one wall thereof. The container is adapted to receive the pictures and a light reflecting lid is provided to direct light onto the pictures.

The prior art devices suffer from several deficiencies. First of all, the lenses used are not always disposed so that they are not scratched or otherwise damaged in use, and they frequently must have a focal length such that the transparency can be viewed and is in focus only when the transparency and lens are separated by a distance which is substantially equal to the length of one side or wall of the container. Moreover, the construction of the previous viewers is such that they do not readily lend themselves to mass production techniques at relatively inexpensive costs. In addition, the prior devices require substantial modification of containers presently being used for delivery of transparencies or the like to customers.

SUMMARY OF THE INVENTION

Among the several objects of the invention may be noted the provision of a combination container and viewer for transparencies or the like wherein a lens used for viewing the transparencies is located so that it is unlikely to be damaged during shipment or normal use of the container; the provision of such a container and viewer combination wherein the lens used is not required to be separated from the transparency by a distance equal to one dimension of the box; the provision of a viewer of transparencies or the like incorporating improved means for mounting or supporting a transparency with respect to a lens; and the provision of a combination container and viewer for transparencies or the like which may be easily mass produced at a relatively low cost.

The devices of the invention incorporate, as part of a shipping container, suitable slot-like formations in walls of the container for supporting a transparency in the desired plane in relation to a lens. The devices further provide novel mounting means for a lens which affords protection for the lens during shipment of the container.

BRIEF DESCRIPTION OF THE DRAWINGS

FIG. 3 is a perspective view of the container shown in FIGS. 1 and 2, illustrating its use for viewing a transparency.

FIG. 4a is a perspective view of a modification of the FIG. 1 container and viewer.

FIG. 4b is a partial section view taken along line 4b—4b of FIG. 4a.

FIG. 5 is a perspective view of another embodiment of a container and viewer of the invention.

FIG. 6 is a bottom view of a further embodiment of the container and viewer of the invention.

FIG. 7 is an elevation view of the container shown in FIG. 6 and illustrating its use for viewing a transparency.

Corresponding reference characters indicate corresponding parts throughout the several views of the drawings.

DESCRIPTION OF THE PREFERRED EMBODIMENTS

Figure 1:
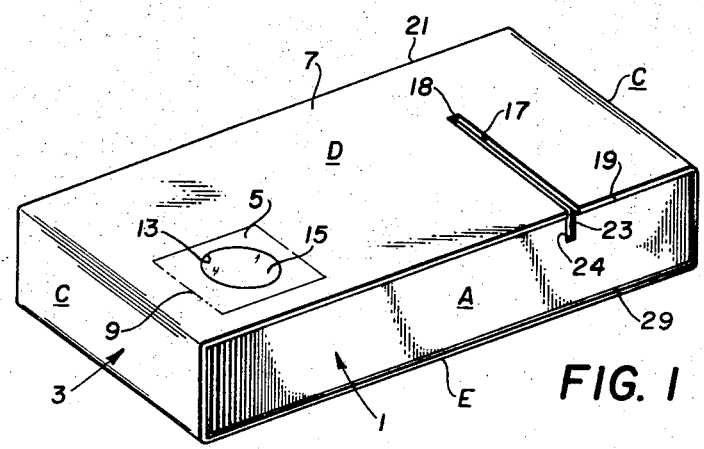
FIG. 1 is a perspective view of a first embodiment of a container and viewer of the invention.
Figure 2:
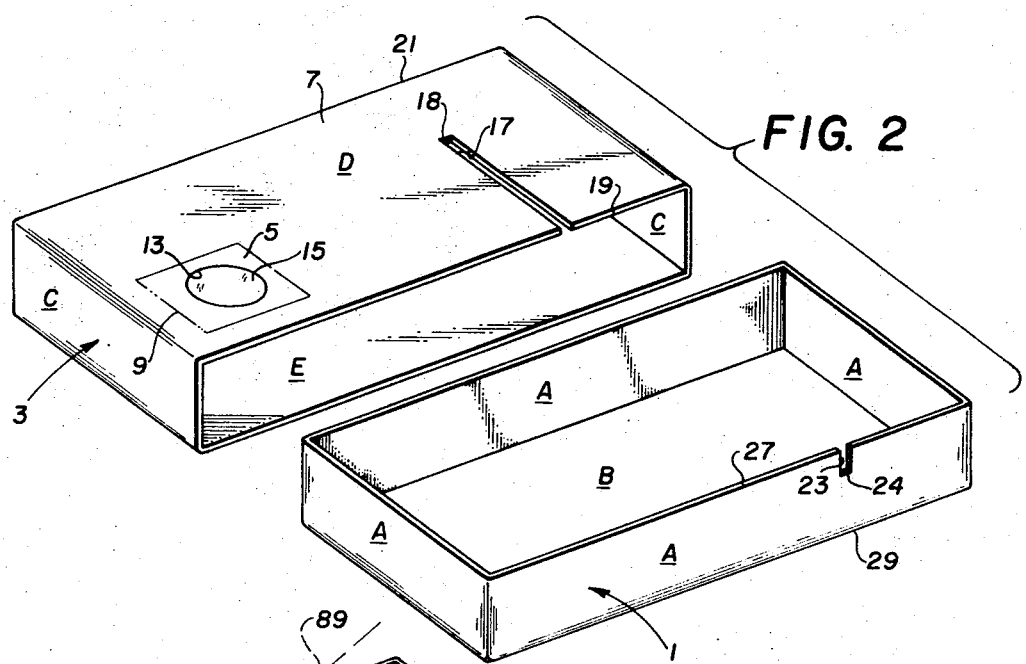
FIG. 2 is an exploded view of the embodiment shown in FIG. 1.

The various embodiments of this invention may be formed from cardboard, plastic, or other suitable packaging materials. Referring now to FIGS. 1, 2 and 3 of the drawings, a first embodiment of the invention comprises a box portion 1 having side and end walls, each of which is designated A, and a bottom B. Box portion 1 is open at the top, as shown, and photographic images are stored therein. A cover portion 3 has two endwalls C, a top D, a bottom E, and is open at both sides. Box portion 1 is adapted to slide into the cover portion 3 to form therewith a container as shown in FIG. 1.

A flap 5 integrally formed from top D is normally in a stored position (FIGS. 1 and 2) wherein it is substantially coplanar with the top surface 7 of the cover portion 3. The flap is preferably formed from a segment of top D by a three-sided cut in top D and by forming a weakened bend or hinge line along side 9 of the segment. The formation of flap 5 produces a correspondingly sized rectangular opening 11 (FIG. 3) in the top. The flap can be swung about side 9 between its stored position (FIGS. 1 and 2) wherein it fits within the opening and a second or viewing position (FIG. 3) wherein it is substantially perpendicular relative to the opening 11 and the rest of top D. The flap 5 is normally manually held in its raised position when a transparency is being viewed.

The flap 5 has an opening 13 therein which receives a magnifying lens 15 to enable an individual using the viewer to observe an enlarged image. It is desirable for the lens 15 to fit entirely within the opening 13 so that no part of it extends above the surface 7 when the flap 5 is in its storage (FIG. 1) position. This facilitates packaging of the container and prevents damage to the lens during mailing. The lens may be cemented or secured by other suitable means to the flap.

The lens 15 is oriented within opening 13 so that when the flap is in its raised or viewing (FIG. 3) position substantially perpendicular to surface 7, the optical axis 16 (FIG. 3) of the lens is substantially parallel to the plane of surface 7. A slot 17 in top D is located with respect to the flap 5 when the flap is in its viewing position so that a transparency supported in the slot is in focus and can be viewed through lens 15. Furthermore, the slot 17 is substantially perpendicular to the optical axis 16 and extends from one side edge 19 of the top D toward the opposite side edge 21 thereof. A second slot 23, equal in width to slot 17, is formed in one sidewall A of the box portion 1 and extends from the top edge 27 toward the bottom edge 29 thereof (FIG. 2). When the box portion 1 and cover portion 3 are assembled, the length of slot 17 is substantially perpendicular to and in communication with the slot 23. These slots cooperate to slidably receive the film images and properly support them for viewing, as will be explained more fully hereinafter.

By way of example, a photographic record or image to be viewed may be a photographic transparency generally designated 31 (FIG. 3). The transparency illustrated comprises a piece of photographic film 33 having an image thereon, the film being mounted in a cardboard frame 37 with the image visible through an aperture 35 in the frame. The thickness of the frame 37 is substantially the same as the width of the slots 17 and 23. Therefore, slidable insertion of one such frame 37 into these slots results in frictional engagement of the frame 37 by the slots 17 and 23.

The construction of the container and viewer of this invention is such that a transparency is mounted so that it is accurately located with respect to each of three axes perpendicular to each other and passing through the transparency. For example, slot 17 engages the transparency 31 along its length to prevent rotational movement of the transparency about an axis extending through the transparency 31 from the top to the bottom thereof as viewed in FIG. 3. Similarly, the slot 23 prevents rotational movement of the transparency 31 about an axis passing transversely (left to right as viewed in FIG. 3) through the transparency. Contact between the edges of the transparency and the ends 18 and 24 of slots 17 and 23, respectively, prevents rotational movement about an axis passing through the transparency 31 in a direction parallel to the axis 16 of the lens. In this regard, it will be observed from FIG. 3 that the length of slot 17 is greater than one-half of the length of the transparency but is less than the total length of the transparency. This locates the center of gravity of the transparency between ends 18 and 24 of the slots 17 and 23 when the transparency is fully inserted therein. The gravational forces acting on the transparency tend to hold the edges of the transparency against the ends 18 and 24 of the slots and prevent rotational movement of the transparency in the opposite direction, i.e., in a clockwise direction as viewed in FIG. 3. Thus, the transparency 31 is quite stable when properly mounted on the viewer.

It will be observed from FIG. 3 that the length of slot 23 is dimensioned with respect to the frame 37 of the transparency so that the entire area of the film 33 within aperture 35 is visible above surface 7 of the container when the transparency is fully inserted into the slots 17 and 23.

To use the article of the invention as a viewer, the flap 5 is raised from its storage (FIG. 1) position to its viewing (FIG. 3) position. Then a transparency 31 is slidably inserted into slots 17 and 23 wherein it occupies a geometric plane which is substantially perpendicular to the optical axis of the lens 15 and perpendicular to the top surface 7 of the cover portion. It is to be understood that when the device of the invention is used as a viewer, the transparency may be placed between the lens and any suitable available light source to obtain the amount of illumination necessary to view the image.

In order to use the article of the invention as a container, the box and cover portions are separted in the manner illustrated in FIG. 2, and one or a plurality of photographic images are placed in box portion 1 on the bottom B and within the confines of the walls A. Then the box portion is slid into the cover portion through an open side thereof. The resulting container can be further wrapped for shipping, if so desired.

When the invention is utilized as a container for mailing transparencies, and when the box and cover portions 1 and 3 are made of cardboard, it is sometimes desirable to permanently bond or cement to the exterior of portions 1 and 3 a thin cover paper 38 (FIGS. 4a and 4b) having advertising or other printed matter (not shown) thereon. For the protection of the transparencies during mailing, it is desirable to apply this cover paper after the slots 17 and 23 have been formed so that the slots are covered to protect the transparencies during mailing. However, upon receipt of the container and viewer, the portion of the paper covering the slots is easily ruptured to permit use of the slots for their intended purpose.

The embodiments illustrated in FIGS. 5–7 utilize the basic constructions of the invention as set forth in the preceding description. Referring now to FIG. 5, this embodiment of the invention is shown in connection with a different shape and style container. The FIG. 5 container includes a box portion 39 having two sidewalls F, two endwalls G which are dimensionally narrower than the sidewalls F, and a bottom H. Box portion 39 is open at the top (not shown). The container also includes a cover portion 47, which fits over the open top of box portion 39. Cover portion 47 has two sidewalls I, two endwalls J, a top K and it is open at the bottom.

A flap 49 has an aperture 51 with a magnifying lens 53 disposed therein. The flap is formed in a manner similar to flap 5 from an integral part of one sidewall F of the box portion 39. Flap 49 is movable between a first or stored position wherein it fits within an opening 43, produced by the formation of the flap 49, and a second raised or viewing position wherein it is substantially perpendicular relative to that opening.

A slot 55 in one sidewall F extends from the bottom edge 57 of that sidewall towards its top edge. Slot 55 is located substantially perpendicular to the optical axis of the lens 53 when the flap 49 is in its viewing position. A slot 59 in box bottom H communicates with and is substantially perpendicular to the first slot 55. This slot, having a width equal to slot 55, extends from edge 57 of the sidewall F toward the bottom edge 61 of the opposite sidewall. Slots 55 and 59 serve to mount a photographic image in a manner similar to that of slots 17 and 23.

In using the embodiment of the invention shown in FIG. 5, the flap 49 and lens 53 are moved to their raised position. A filmed image, such as a transparency 31, is inserted into the slots 55 and 59. The transparency is then oriented substantially perpendicular to the optical axis of the lens in the same manner described in connection with FIGS. 1–3. Available light is utilized for viewing a magnified image through the lens.

The embodiment of the invention illustrated in FIGS. 6 and 7 utilizes a box portion 63 and a cover portion 65 which are the same type and general configuration as those used in the embodiment of FIG. 5. In this embodiment a flap 67, which is similar to the flaps previously described, is located on the bottom H of the box portion. The flap 67 is movable between a first or stored position (FIG. 6) wherein it fits within an opening 71 resulting from the formation of the flap 67 and a second or raised position (FIG. 7) wherein it is oriented substantially perpendicular to opening 71 for viewing a transparency or the like. The flap 67 has an opening 73 with a lens 75 disposed therein. Three slots 77 in the bottom H of the box portion 63 are adapted to receive and mount the photographic images. These slots 77 are substantially perpendicular to the optical axis of the lens, and the center slot is disposed with respect to the lens when the flap is in its viewing position so that the image on a transparency mounted in slots 77 normally is in focus when viewed through the lens. If a particular image is out of focus, it may be placed in one of the end slots as a means of compensation. When the width of the bottom is less than the width of the filmed image (as shown in the drawings), two slots 79 are provided at the ends of each slot 77 and in communication therewith. Slots 79 extend from each bottom slot 77 equal distances on the two opposite sidewalls F and serve a purpose similar to that of slot 23 of the first embodiment. FIG. 7 shows this embodiment of the invention with the flap 67 and the lens 75 in their raised or viewing positions and with a transparency mounted in the center one of the slots 77 and 79.

Figure 8:
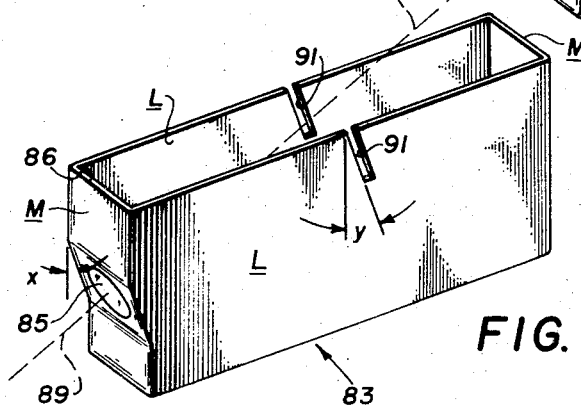
FIG. 8 is a perspective view of an additional embodiment of the container and viewer of the invention.

Another embodiment of the invention is illustrated in FIG. 8 of the drawings. The style and shape of the container of this embodiment is similar to that illustrated in FIGS. 5–7, and, accordingly, the cover portion (which would correspond to cover 47) has been omitted. The box portion 83 comprises a pair of spaced and generally parallel elongate sidewalls L, spaced endwalls M at the ends of sidewalls L, and a bottom wall (not shown). A box portion is open at the top thereof as illustrated so that transparencies or the like can be inserted through the open top into the container. A lens 85 is carried by one endwall M and is preferably oriented so that it is inclined downwardly and inwardly (as viewed in FIG. 8) from its upper edge 86 toward the bottom of the container at an acute angle generally designated X. This inclination of the lens locates the optical axis 89 of the lens so that it extends through the hollow center of the box portion and out the open top thereof approximately midway between the ends M. Because the lens 85 is located in the manner explained above, the wall M containing the lens may be somewhat thicker than the corresponding wall of the previously described embodiments. When box portion 83 is moulded from suitable plastics, the lens can be integrally formed in wall M.

Two slots 91 are provided in the sidewalls L and extend from the upper edge of the respective sidewalls downwardly toward the bottom of the box portion at an inclined angle Y, which is substantially equal to the angle X. With this arrangement, a transparency or other photographic image mounted in slots 91 is supported in a plane which is substantially perpendicular to the optical axis 89 of lens 85. It will be understood that slots 91 are aligned with each other, i.e., they are equally spaced from the endwalls M of the box. The embodiment of the invention illustrated in FIG. 8 is used in a manner similar to that previously described for the other embodiments, i.e., a transparency is positioned within slots 91 and viewed by looking through lens 85 while directing the viewer toward a suitable source of available light.

In each of the embodiments of the invention previously described, the mounting means for the transparencies are positioned with respect to the optical axis of the lens when the lens is in its viewing position so that the optical axis passes through the center portion of the transparency. Moreover, in each embodiment the transparency is held so that it may be lighted from behind, that is from the side opposite the lens without available light being blocked by adjacent portions of the container. In each embodiment, the lens may be mass produced and relatively inexpensive lenses that would thereby minimize the cost of the viewer. Moreover, the lens, when in its stored position, does not project significantly from the adjacent portions of the container where it would be subject to being broken off or damaged by scratching, etc. Furthermore, the size of the box does not restrict the choice of a lens to one particular focal length determined by the box dimensions. While the use of multiple slide mounting slots has been illustrated only in FIGS. 6 and 7, it will be understood that a plurality of such slots can be used in the other embodiments of the invention is desired.

The invention has been described in detail with reference to preferred embodiments thereof, but it will be understood that variations and modifications can be effected within the spirit and scope of the invention as described hereinabove and as defined by the appended claims.

I claim:

1. A device for receiving and storing photographic records or the like, said device comprising:
   a box portion comprising a bottom, two sidewalls, and two endwalls jointly defining a chamber for receiving and storing photographic records;
   each of said sidewalls of said box portion having an edge that is in a plane that is substantially parallel to the bottom of said box portion, each of said sidewalls having an elongate slot in said edge thereof with said slots being disposed with respect to said edges to jointly receive and mount photographic records or the like in a plane that is non-perpendicular to the plane of said edges and to said bottom, each of said slots being approximately midway between said endwalls, and said slots being coplanar with respect to each other and aligned to prevent movement of the record about three axes substantially perpendicular to each other and passing through a photographic record positioned in said slot;
   a cover portion engageable with said box portion to cooperate therewith to substantially close said chamber;
   a lens having an optical axis, said lens being located within one of said endwalls and oriented so that said lens is substantially parallel to the plane of said slots and inclined downward and inward from its upper edge toward the bottom of the container with the optical axis of the lens extending through said chamber perpendicular to the plane of said slots.

2. A combination container and viewer for photographic records or the like, said container and viewer comprising:
   a box portion for receiving and storing photographic records;
   a cover portion engageable with the box portion to form therewith a container defining a substantially closed space for storing photographic records or the like;
   one of said portions having a wall with a surface, said wall having a segment therein that is movable with respect to other portions of the wall;
   a lens carried by said segment and having an optical axis, said segment being mounted on said wall for movement of said segment and said lens between (1) a viewing position wherein said segment and lens are outside the boundary of said space and are substantially perpendicular to said surface so that said optical axis of said lens is substantially parallel to said surface of said wall and (2) a stored position wherein said segment and said lens lie substantially in the same plane as said wall;
   one of said container portions having means therewith for receiving and mounting a photographic record in a plane substantially perpendicular to the optical axis of the lens and located with respect to said lens for viewing through said lens when the lens is in its viewing position;
   the cover portion comprising a top, a bottom, and two endwalls, said segment being attached to said top;
   the box portion comprising a bottom, two sidewalls and two endwalls; and the record receiving and mounting means comprising (1) a first slot in said top extending perpendicularly to the optical axis of and separated from the lens when the lens is in its viewing position, and (2) a second slot in one sidewall of said box portion, the second slot being positioned to be in communication with said first slot when the box and cover portions are assembled.

3. A combination container and viewer for photographic records or the like, said container and viewer comprising:

a box portion for receiving and storing photographic records;

a cover portion engageable with the box portion to form therewith a container defining a substantially closed space for storing photographic records or the like;

one of said portions having a wall with a surface, said wall having a segment therein that is movable with respect to other portions of the wall;

a lens carried by said segment and having an optical axis, said segment being mounted on said wall for movement of said segment and said lens between (1) a viewing position wherein said segment and lens are outside the boundary of said space and are substantially perpendicular to said surface so that said optical axis of said lens is substantially parallel to said surface of said wall and (2) a stored position wherein said segment and said lens lies substantially in the same plane as said wall;

one of said container portions having means therewith for receiving and mounting a photographic record in a plane substantially perpendicular to the optical axis of the lens and located with respect to said lens for viewing through said lens when the lens is in its viewing position;

the cover portion comprising a top, two sidewalls, and two endwalls;

the box portion comprising a bottom, two sidewalls, and two endwalls, said segment being attached to said bottom; and said record receiving and mounting means comprising (1) a first slot in said bottom extending perpendicularly to the optical axis of and separated from the lens when the lens is in its viewing position, and (2) a pair of parallel slots in the sidewalls of said box portion communicating with the ends of said first slot;

a second slot in said bottom of said box portion extending perpendicularly to the optical axis of the lens and separated from the lens by a distance other than the spacing between the first slot and the lens when the lens is in its viewing position, and a second pair of parallel slots in the sidewalls of said box portion communicating with the ends of said second slot.

4. A combination container and viewer for photographic records or the like, said container and viewer comprising:

a box portion for receiving and storing photographic records;

a cover portion engageable with the box portion to form therewith a container defining a substantially closed space for storing photographic records or the like;

one of said portions having a wall with a surface, said wall having a segment therein that is movable with respect to other portions of said wall;

a lens carried by said segment and having an optical axis, said segment being mounted on said wall for movement of said segment and said lens between (1) a viewing position wherein said segment and lens are outside the boundary of said space and are substantially perpendicular to said surface so that said optical axis of said lens is substantially parallel to said surface of said wall and (2) a stored position wherein said segment and said lens lie substantially in the same plane as said wall, and said segment carrying said lens comprising a flap integrally formed from said wall and attached thereto by means of a flexible weakened area of said wall forming a hinge line about which said flap is movable between its two positions; and one of said container portions having means therewith for receiving and mounting a photographic record in a plane substantially perpendicular to the optical axis of the lens and located with respect to said lens for viewing through said lens when the lens is in its viewing position.

5. A combination container and viewer for photographic records or the like, said container and viewer comprising:

a box portion for receiving and storing photographic records;

a cover portion engageable with the box portion to form therewith a container defining a substantially closed space for storing photographic records or the like;

one of said portions having a wall with a surface, said wall having a segment therein that is movable with respect to other portions of the wall;

a lens carried by said segment and having an optical axis, said segment being mounted on said wall for movement of said segment and said lens between (1) a viewing position wherein said segment and lens are outside the boundary of said space and are substantially perpendicular to said surface so that said optical axis of said lens is substantially parallel to said surface of said wall and (2) a stored position wherein said segment and said lens lie substantially in the same plane as said wall;

one of said container portions having means therewith for receiving and mounting a photographic record in a plane substantially perpendicular to the optical axis of the lens and located with respect to said lens for viewing through said lens when the lens is in its viewing position, said receiving and mounting means comprising slot means for receiving a record or the like; and means covering said slot means, said cover means being easily ruptured for insertion of a record or the like into said slot means.

References Cited

UNITED STATES PATENTS

| | | | |
|---|---|---|---|
| 1,989,454 | 1/1935 | Koster | 40—63AX |
| 2,580,164 | 12/1951 | Flynn | 40—63A |
| 2,809,452 | 11/1957 | Brown | 40—63A |
| 2,919,509 | 1/1960 | Strandberg | 40—63A |
| 3,019,691 | 2/1962 | Schneider | 40—106.1 |

LAWRENCE CHARLES, Primary Examiner